United States Patent [19]

Berneth

[11] Patent Number: 5,391,748

[45] Date of Patent: Feb. 21, 1995

[54] DIHYDROQUINOLINES

[75] Inventor: Horst Berneth, Leverkusen, Germany

[73] Assignee: Bayer Aktiengesellschaft, Leverkusen, Germany

[21] Appl. No.: 161,837

[22] Filed: Dec. 3, 1993

[30] Foreign Application Priority Data

Dec. 10, 1992 [DE] Germany ............................. 4241621

[51] Int. Cl.⁶ .................. C07D 401/04; C07D 401/02
[52] U.S. Cl. ...................................... 546/165; 546/18; 544/128
[58] Field of Search .................... 546/165, 18; 544/128

[56] References Cited

U.S. PATENT DOCUMENTS

| | | | |
|---|---|---|---|
| 3,833,400 | 9/1974 | Matsukawa | 546/165 |
| 4,835,270 | 5/1989 | Berneth | 544/73 |
| 5,246,606 | 9/1993 | Evans | 546/165 |

FOREIGN PATENT DOCUMENTS 316277  11/1988  European Pat. Off. .

*Primary Examiner*—C. Warren Ivy
*Assistant Examiner*—D. Margaret M. Mach
*Attorney, Agent, or Firm*—Sprung Horn Kramer & Woods

[57] ABSTRACT

The present invention relates to dihydroquinolines of formula (I):

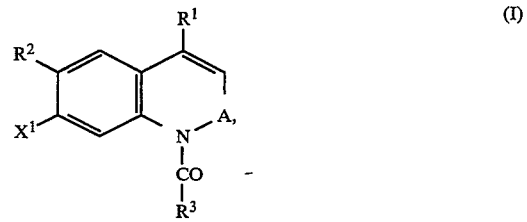

in which the symbols used are as defined in the description, to a process for their preparation, to their use in recording materials and to recording materials in which such dihydroquinolines are present.

6 Claims, No Drawings

DIHYDROQUINOLINES

U.S. Pat. No. 4 835 270 has disclosed that triarylmethane dyestuffs with an acylamino group in the 2-position of one of the aryl radicals cyclise to 3,1-benzoxazines in a neutral to basic medium. If one or two of the aryl radicals are replaced with indole radicals, the same mode of reaction is found (European patent application A-0 316 277).

The present invention relates to dihydroquinolines of formula.(I) explained in detail below, to a process for their preparation, to dyestuffs of formula (VIII) explained in detail below, to the use of the dihydroquinolines of formula (I) in carbonless copy, thermoreactive, electrochromic and photochromic recording materials and to pressure-sensitive, heat-sensitive, electrosensitive and photosensitive recording materials in which at least one dihydroquinoline of formula (I) is present.

The dihydroquinolines of the present invention have formula (I):

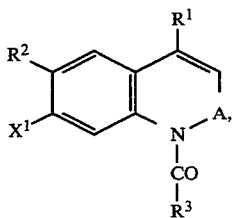

in which

A is one of the bivalent groups of formulae (II) to (V):

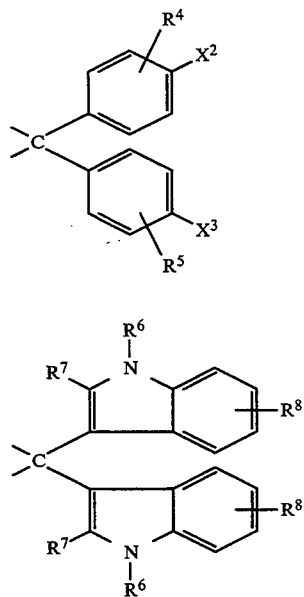

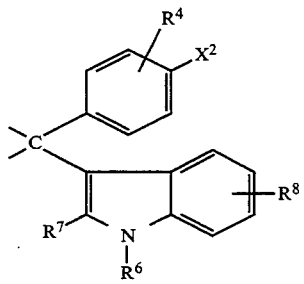

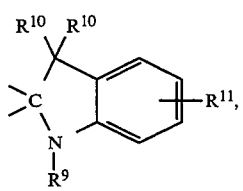

$R^1$ is hydrogen, alkyl or a radical of formula (VI):

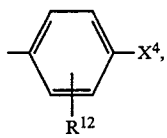

$R^2$, $R^4$, $R^5$, $R^8$, $R^{11}$ and $R^{12}$ independently of one another are each hydrogen, halogen, alkyl or alkoxy, $R^3$ is hydrogen, alkyl, cycloalkyl, aralkyl, aryl or a heterocyclic radical, $R^6$ and $R^9$ independently of one another are each hydrogen, alkyl, chloroalkyl or aralkyl, $R^7$ is hydrogen, alkyl, cycloalkyl or aryl, $R^{10}$ is alkyl, and $X^1$, $X^2$, $X^3$ and $X^4$ independently of one another are each hydrogen, halogen, alkyl, alkoxy, cycloalkoxy, aryloxy, dialkylamino, N-alkyl-N-arylamino or a heterocyclic radical bonded via a nitrogen atom, with the provisos that in the case where A=a radical of formula (II), (III) or (IV), at most 2 of the radicals $X^1$ to $X^4$ are hydrogen, halogen and/or alkyl, and in the case where A=a radical of formula (V), at most one of the radicals $X^1$ and $X^4$ is hydrogen, halogen or alkyl.

If the radicals $R^1$ to $R^{12}$ and $X^1$ to $X^4$ are alkyl, possible examples are linear or branched $C_1$–$C_4$-alkyl radicals which are unsubstituted or substituted by at most three substituents from the group comprising chlorine, hydroxyl, methoxy, ethoxy and cyano.

If the radicals $R^2$, $R^4$, $R^5$, $R^8$, $R^{11}$ and $R^{12}$ and $X^1$ to $X^4$ are halogen, possible examples are fluorine or chlorine.

If the radicals $R^2$, $R^4$, $R^5$, $R^8$, $R^{11}$ and $R^{12}$ and $X^1$ to $X^4$ are alkoxy, possible examples are linear or branched $C_1$–$C_4$-alkoxy radicals which are unsubstituted or substituted by at most three substituents from the group comprising chlorine, hydroxyl, methoxy, ethoxy and cyano.

If the radicals $R^3$, $R^6$, $R^7$ and $R^9$ are cycloalkyl, possible examples are $C_5$–$C_7$-cycloalkyl radicals which are unsubstituted or substituted by at most two substituents from the group comprising chlorine, methyl and methoxy.

If the radicals $R^3$ and $R^7$ are aryl, possible examples are phenyl which is unsubstituted or substituted by at most 2 substituents from the group comprising chlorine, methyl and methoxy.

If the radicals $R^3$, $R^6$ and $R^9$ are aralkyl, a possible example is an unsubstituted benzyl radical.

If the radical $R^3$ is a heterocyclic radical, possible examples are an unsubstituted 2-, 3- or 4-pyridyl radical.

If the radicals $X^1$ to $X^4$ are cycloalkoxy, a possible example is unsubstituted $C_5$–$C_7$-cycloalkoxy.

If the radicals $X^1$ to $X^4$ are aryloxy, possible examples are phenoxy which is unsubstituted or substituted by at most 2 substituents from the group comprising chlorine, methyl and methoxy.

If the radicals $X^1$ to $X^4$ are dialkylamino and N-alkyl-N-arylamino, possible examples of the alkyl groups present linear or branched $C_1$–$C_4$-alkyl groups which are unsubstituted or substituted by a chlorine, hydroxyl, methoxy or cyano group.

If the radicals $X^1$ to $X^4$ are N-alkyl-N-arylamino, possible examples of the aryl groups present therein are a phenyl radical which is unsubstituted or substituted by at most 2 substituents from the group comprising chlorine, methyl, methoxy and cyano.

If the radicals $X^1$ to $X^4$ are a heterocyclic radical bonded via a nitrogen atom, possible examples are an unsubstituted pyrrolidino, piperidino or morpholino radical.

Preferred dihydroquinolines according to the invention are those of formula (I) in which A is a bivalent group of formula (II),
$R^1$ is hydrogen or a radical of formula (VI),
$R^2$ is hydrogen, chlorine, methyl or methoxy,
$R^3$ is phenyl optionally substituted by chlorine, methyl or methoxy,
$R^4$, $R^5$ and $R^{12}$ are hydrogen,
$X^1$ methoxy, ethoxy, dimethylamino, diethylamino, N-methyl-N-phenylamino, N-methyl-N-(4-methoxyphenyl)-amino, pyrrolidino, piperidino or morpholino,
$X^2$ is dimethylamino, diethylamino, N-methyl-N-phenylamino, N-methyl-N-(4-methoxyphenyl)-amino, pyrrolidino, piperidino or morpholino, and
$X^3$ and $X^4$ independently of one another are hydrogen, chlorine, methyl, methoxy, ethoxy, dimethylamino, diethylamino, N-methyl-N-phenylamino, N-methyl-N-(4-methoxyphenyl)-amino, pyrrolidino, piperidino or morpholino.

Other preferred dihydroquinolines according to the invention are those of formula (I) in which A is a bivalent group of formula (III),
$R^1$ is hydrogen or a radical of formula (VI),
$R^2$ is hydrogen, chlorine, methyl or methoxy,
$R^3$ is phenyl optionally substituted by chlorine, methyl or methoxy,
$R^6$ is hydrogen, methyl, ethyl, propyl, butyl or benzyl,
$R^7$ is methyl, ethyl, phenyl, 4-methylphenyl or 4-methoxyphenyl,
$R^8$ and $R^{12}$ are hydrogen,
$X^1$ is methoxy, ethoxy, dimethylamino, diethylamino, N-methyl-N-phenylamino, N-methyl-N-(4-methoxy-phenyl)-amino, pyrrolidino, piperidino or morpholino, and
$X^4$ is hydrogen, chlorine, methyl, methoxy, ethoxy, dimethylamino, diethylamino, N-methyl-N-phenylamino, N-methyl-N-(4-methoxyphenyl)-amino, pyrrolidino, piperidino or morpholino.

Other preferred dihydroquinolines according to the invention are those of formula (I) in which A is a bivalent group of formula (IV),
$R^1$ is hydrogen or the radical of formula (VI),
$R^2$ is hydrogen, chlorine, methyl or methoxy,
$R^3$ is phenyl optionally substituted by chlorine, methyl or methoxy,
$R^6$ is hydrogen, methyl, ethyl, propyl, butyl or benzyl,
$R^7$ is methyl, ethyl, phenyl, 4-methylphenyl or 4-methoxyphenyl,
$R^4$ and $R^8$ are hydrogen,
$X^1$ is methoxy, ethoxy, dimethylamino, diethylamino, N-methyl-N-phenylamino, N-methyl-N-(4-methoxy-phenyl)-amino, pyrrolidino, piperidino or morpholino,
$X^2$ is dimethylamino, diethylamino, N-methyl-N-phenylamino, N-methyl-N-(4-methoxyphenyl)-amino, pyrrolidino, piperidino or morpholino, and
$X^4$ is hydrogen, chlorine, methyl, methoxy, ethoxy, dimethylamino, diethylamino, N-methyl-N-phenylamino, N-methyl-N-(4-methoxyphenyl)-amino, pyrrolidino, piperidino or morpholino.

Other preferred dihydroquinolines according to the invention are those of formula (I) in which A is a bivalent group of formula (V),
$R^1$ is hydrogen or a radical of formula (VI),
$R^2$ is hydrogen, chlorine, methyl or methoxy,
$R^3$ is phenyl optionally substituted by chlorine, methyl or methoxy,
$R^9$ is methyl, ethyl or benzyl,
$R^{10}$ is methyl,
$R^{11}$ is hydrogen, and
$X^1$ is methoxy, ethoxy, dimethylamino, diethylamino, N-methyl-N-phenylamino, N-methyl-N-(4-methoxyphenyl)-amino, pyrrolidino, piperidino or morpholino.

The dihydroquinolines of formula (I) are normally colourless or weakly coloured.

When dihydroquinolines according to the invention are used in recording materials, the recording materials can optionally contain other colour formers and colour developers and can optionally contain other additives. Suitable developers are especially clays, acidic oxides, boric acid, acidic salts, monomeric and polymeric phenols, carboxylic acids and/or acid-modified polymers, e.g. those of acrylonitrile.

When dihydroquinolines according to the invention are brought into contact with the developer, intense blue, green, black, violet or red shades are obtained which have excellent sublimation fastness and lightfastness. Navy blue, grey or black colourations can be obtained by intermixing.

Dihydroquinolines according to the invention of formula (I) in which A is a bivalent group of formulae (II) to (IV) exhibit absorptions in the range 600 to 800 nm in their developed form. They are therefore particularly suitable for the preparation of recording materials which can be read in this wavelength range.

Recording materials which absorb in the near infrared are required in order to be able to read the recorded information with suitable devices.

Processing with computers and automatic data processing require devices capable of reading information from documents. Optical character recognition (OCR) devices were therefore developed which are capable of reading pages of text printed in the appropriate programmed typeface. Conventionally, such devices operate in the near infrared and the print to be read must therefore have absorptions in the near infrared. However, conventional pressure- and heat-sensitive recording materials do not have such an absorption in the near infrared. The dihydroquinolines according to the invention of formula (I) in which A is a bivalent group of formulae (II) to (IV), and mixtures thereof, are outstandingly suitable for such OCR-readable recording materials. They can also easily be added to existing mixtures of colour formers which develop e.g. blue or black shades in known manner.

When dihydroquinolines according to the invention are used in a mixture with one or more other colour formers, suitable examples of other colour formers are 3,3-bis-(aminophenyl)-phthalides, 3,3-bis-(indolyl)-phthalides, 3-amino-fluorans, spirodipyrans, chromenoindoles, phenoxazines, phenothiazines, carbazolylmethanes, 4,4-diaryldihydroquinazolones, 4,4-diaryl-3,1-benzoxazines, 4-indolyl-4-aryl-3,1-benzoxazines and triarylmethane leuco dyestuffs. Such mixtures give for example green, violet, blue, navy blue, grey or black colourations.

Dihydroquinolines according to the invention exhibit a good colour intensity when developed with both phenols and, in particular, activated clays. They are especially suitable as colour formers for use in a heat-sensitive or pressure-sensitive recording material, which can be either copy material or recording material. In general, they are distinguished by a high developing rate with a simultaneously reduced sensitivity of the recording materials towards unintentional premature development. Their developed shade is reached immediately without unwanted changes in shade occurring during or following development.

Dihydroquinolines according to the invention are also distinguished by a good lightfastness and ageing resistance, in both the developed and undeveloped state.

If dihydroquinolines according to the invention are used in pressure-sensitive materials, this pressure-sensitive material consists for example of at least one pair of sheets of paper, one sheet containing at least one dihydroquinoline of formula (I), dissolved or dispersed in a non-volatile organic solvent, and the other sheet containing the developer.

The principle of such pressure-sensitive materials is known for example from U.S. Pat. Nos. 2,800,457, 2,800,458, 2,948,753, 3,096,189 and 3,193,404 and from German Offenlegungsschriften 2,555,080 and 2,700,937.

To prevent premature activation of the dihydroquinolines present in the pressure-sensitive recording material, they are preferably enclosed in microcapsules which break open under the action of pressure.

Examples of suitable capsule wall materials are gelatin/gum arabic, polyamides, polyurethanes, polysulphonamides, polyesters, polycarbonates, polysulphonates, polyacrylates and phenol/formaldehyde or urea/formaldehyde condensation products such as those described for example in M. Gutcho,. Capsule Technology and Microencapsulation, Noyes Data Corporation (1972), and G. Baster, Microencapsulation, Processes and Applications, published by J. E. Vandegaar, and German Offenlegungsschriften 2,237,545 and 2,119,933.

The preferred microcapsules within the framework of the present invention are those whose shells consist of polyaddition products of polyisocyanates and polyamines.

Isocyanates which can be used to prepare such microcapsules are e.g. diisocyanates, polyisocyanates, diisocyanates with a biuret structure, polyisocyanates modified by di- or tri-functional alcohols, and/or other modified polyisocyanates, e.g. those of the formula

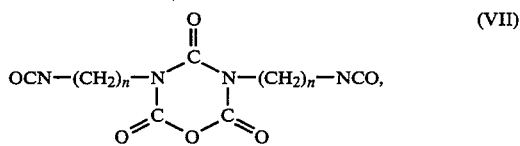

(VII)

in which n is an integer from 3 to 6, and polyamines which can be used are e.g. aliphatic primary or secondary di- and/or polyamines.

Isocyanates, amines, solvents for isocyanates and colour formers and suitable preparative processes for such microcapsules are described for example in German Offenlegungsschrift 3,203,059.

Thermoreactive recording materials are e.g. heat-sensitive recording and copy materials, especially those based on paper. The principle of such materials is described for example in German Offenlegungsschrift 2,555,080. Developers which are suitable for this purpose are the same substances as those which can be used for pressure-sensitive recording materials. The preferred developers are phenolic compounds such as those described for example in German patent specification 1,251,348, as well as boric acid and organic, preferably aliphatic dicarboxylic acids.

Another principle of thermoreactive developing materials is described in German Offenlegungsschrift 3,337,296. According to this principle, acid-modified polymers, preferably those of acrylonitrile, act as developers.

The principle of electrochromic recording materials is described for example in European patent application A 0 108 382. The base is for example a paper which has been impregnated with a solution of a colour former and dried. After moistening with a salt solution (e.g. containing sodium bromide, potassium chloride or calcium chloride), a colouration can be produced by applying a voltage.

Photochromic recording materials are described for example in Japanese patent application A 57/65753. The colour former is dissolved in a layer of polymeric material, for example polymethacrylate, polycarbonate or polyvinyl chloride. The polymer layer then becomes coloured on exposure to light.

The dihydroquinolines according to the invention are suitable as colour formers for all these described applications.

The present invention further relates to dyestuffs of formula (VIII):

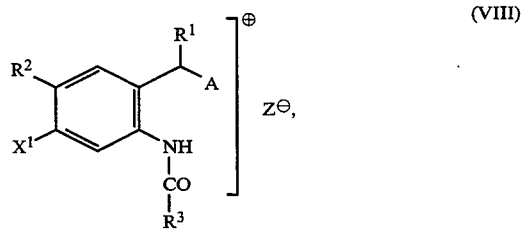

(VIII)

in which

A, $R^1$ to $R^{12}$ and $X^1$ to $X^4$ have the general and preferred definitions given for formula (I), and $Z^\ominus$ is an anion.

In formula (VIII), $Z^\ominus$ is for-example chloride, bromide, iodide, perchlorate, tetrafluoroborate, trichlorozincate, hydrogensulphate, dihydrogenphosphate, methanesulphonate, benzenesulphonate or toluenesulphonate and preferably chloride, bromide, methanesulphonate or perchlorate.

The dyestuffs of formula (VIII) and the dihydroquinolines of formula (I), which give the dyestuffs of formula (VIII) in an acid medium, can also be used for example for dyeing polyacrylonitrile, tanned cotton, paper and other acid-modified fibres, woven fabrics and powders.

The process according to the invention for the preparation of dihydroquinolines of formula (I) is characterised in that a carbonyl compound of formula (IX):

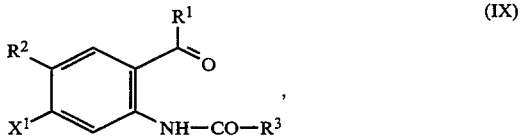

(IX)

in which $R^1$, $R^2$, $R^3$, $R^{12}$, $X^1$ and $X^4$ are as defined for formula (I), is condensed with a methylene base of formula (X):

$H_2C=A$ (X), in which

A is a bivalent group of formulae (II) to (V), $R^4$ to $R^{11}$, $X^2$ and $X^3$ having the broadest definitions given for formula (I).

Compounds of formula (IX) are known (see German Offenlegungsschrift 3,500,361) or can be prepared by analogous methods. The methylene bases of formula (X) are also known (see Liebigs Ann. Chem.461, 152 (1928), and German Offenlegungsschrift 3 738 237) or can be prepared by analogous methods.

The condensation reaction can be carried out with conventional dehydrating reagents, optionally in the presence of solvents which are inert under the reaction conditions, at temperatures for example of between 0° C. and the boiling point of the medium. When the condensation reaction is complete, the reaction mixture can be discharged into water or an alcohol, for example, and the dyestuffs of formula (VIII) can be isolated by salting-out.

The dihydroquinolines of formula (I) can be obtained by raising the pH until the colour disappears, if appropriate after removal of the inert solvent. It may be necessary here to heat the reaction mixture for some time in order to eliminate water from carbinol bases which may have formed, and to treat the crude primary product obtained with one or more solvents. Examples of suitable solvents for this purpose are alcohols such as methanol, ethanol, propan-2-ol and butanol, nitriles such as acetonitrile, ketones such as acetone and butanone, hydrocarbons such as toluene and xylene, chlorinated hydrocarbons such as chlorobenzene, dichlorobenzene, chloroform and 1,2-dichloroethane, and esters such as ethyl acetate and butyl acetate. The treatment can be carried out between room temperature and the boiling point of the particular medium and can last for 5 minutes to 5 hours, for example.

Dehydrating reagents can be for example phosphorus oxychloride, phosphorus pentachloride, diphosphorus pentoxide, tniphenylphosphorus dichloride, phosphorus trichloride, phosphorus tribromide, phosgene, sulphuryl chloride, thionyl chloride, acetic anhydride, oxalyl chloride or mixtures thereof.

Phosphorus oxychloride, mixtures containing phosphorus oxychloride and diphosphorus pentoxide, phosgene, oxalyl chloride and acetic anhydride are preferred.

The condensation reaction can also be carried out in the presence of acids, preferably in solvents.

The working-up can then be carried out as described above.

Examples of acids suitable for this purpose are carboxylic acids such as acetic acid and oxalic acid, sulphonic acids such as methanesulphonic acid, trifluoromethanesulphonic acid, benzenesulphonic acid and toluenesulphonic acid, and inorganic acids such as hydrochloric acid, sulphuric acid, phosphoric acid, tetrafluoroboric acid and perchloric acid.

Examples of suitable solvents are the above-mentioned carboxylic acids, alcohols such as methanol, ethanol and butanol, hydrocarbons such as toluene and xylene, chlorinated hydrocarbons such as chlorobenzene, and anhydrides such as acetic anhydride.

The present invention further relates to the use of dihydroquinolines of formula (I) in carbonless copy, thermoreactive, electrochromic and photochromic recording materials and to pressure-sensitive, heat-sensitive, electrosensitive and photosensitive recording materials which are characterised in that they contain at least one dihydroquinoline of formula (I).

In view of the state of the art described at the outset, it is surprising that cyclisation in the case of the products according to the invention proceeds with the formation of dihydroquinolines rather than 3,1-benzoxazines.

EXAMPLES

Example 1

6.7 g of an aldehyde of formula (IX) in which $R^1=R^2=$ hydrogen, $R^3=$ phenyl and $X^1=$ dimethylamino, and 6.38 g of the methylene base of formula (X) in which A=formula (II), $R^4=R^5=X^3=$hydrogen and $X^2=$ diethylamino, were dissolved in 40 ml of acetic anhydride, and 2.45 g of methanesulphonic acid were added. The mixture was then stirred for 1 hour at 65° C. and 1 hour at 90° C. After cooling, it was diluted with 400 ml of water. A solution of 3.1 g of sodium perchlorate in 50 ml of water was added and the precipitate was filtered off with suction and recrystallised from 100 ml of glacial acetic acid to give 2.6 g of the dyestuff of formula (VIII) in which the radicals were as defined above and $Z^\ominus$ was perchlorate.

This dyestuff was introduced into a mixture of 20 ml of toluene and 20 ml of water. The resulting mixture was rendered alkaline with sodium hydroxide solution, the toluene phase was separated off after heating to 50° C. and the solvent was stripped off under vacuum to give 1.2 g of the dihydroquinoline of formula (I) in which the radicals were as defined above. The melting point was 134° to 139° C. The IR spectrum showed characteristic bands at 1660 and 1606 cm$^{-1}$ and a solution in glacial acetic acid had a $\lambda_{max}$ of 722 nm.

Example 2

6.5 g of a ketone of formula (IX) in which $R^1=4$-methoxyphenyl, $R^2=$ hydrogen, $R^3=$ phenyl and $X^1=$ dimethylamino, and 4.6 g of the methylene base of formula (X) in which A=formula (II), $R^4=R^5=$hydrogen and $X^2=X^3=$dimethylamino, were stirred in 40 g of phosphorus oxychloride for 10 hours at 90° C. 100 ml of chloroform were then added and the mixture was discharged into 600 ml of water. The resulting mixture was rendered alkaline with sodium hydroxide solution and the chloroform phase was separated off and distilled in a water separator to remove the water. Finally, the solvent was stripped off under vacuum and the residue was taken up in ethanol. The solution was decolourised by the addition of sodium hydroxide solution. The crystals which had separated out were filtered off with suction, washed with ethanol and dried to give 7.6 g of a beige powder of formula (I) in which the radicals were as defined above, with a melting point of 178° to 180° C. The IR spectrum showed characteristic bands at 1665 and 1611 cm$^{-1}$ and a solution in glacial acetic acid had a $\lambda_{max}$ of 643 nm.

Example 3

3.0 g of an aldehyde of formula (IX) in which $R^1=R^2=$hydrogen, $R^3=$4-chlorophenyl and $X^1=$dimethylamino, and 4.4 g of the methylene base of formula (X) in which A=formula (III), $R^6=$methyl, $R^7=$phenyl and $R^8=$hydrogen, were stirred in a mixture of 20 ml of acetic anhydride and 0.5 ml of methanesulphonic acid for 3.5 hours at 50° C. After cooling, the resulting mixture was discharged into 40 ml of water and the material which had precipitated out was filtered off with suction and washed with methanol. The aqueous filtrate was evaporated to dryness under vacuum and the residue was taken up in the methanolic filtrate and filtered again. The blue filtrate was decolourised with methanolic sodium methylate solution. The light yellow precipitate obtained was filtered off with suction and dried under vacuum to give 3.4 g of the dihydroquinoline of formula (I) in which the radicals were as defined above, with a melting point of 145° to 147° C.

The $^1$H NMR spectrum, run in deuterochloroform, showed characteristic bands at $\delta=5.05$ and 6.00 ppm (both s; both 1H, J=10 Hz) and a solution in glacial acetic acid had a $\lambda_{max}$ of 693 nm.

Examples 4–18

The Examples collated in Tables 1 to 4 were carried out analogously to Examples 1 to 3; the $\lambda_{max}$ case was determined in glacial acetic acid solution.

TABLE 1

| Example no. | A of formula | $X^1$ | $X^2$ | $X^3$ | $R^1$ | $R^2$ | $R^3$ | $R^4$ | $R^5$ | analogous to Ex. | $\lambda_{max}$ [nm] |
|---|---|---|---|---|---|---|---|---|---|---|---|
| 4 | (II) | N(CH$_3$)$_2$ | N(CH$_3$)$_2$ | N(CH$_3$)$_2$ | H | H | C$_6$H$_5$ | H | H | 1 | 694 |
| 5 | (II) | N(CH$_3$)$_2$ | N(C$_2$H$_5$)$_2$ | N(C$_2$H$_5$)$_2$ | H | CH$_3$ | C$_6$H$_5$ | H | H | 1 | 690 |
| 6 | (II) |  | N(C$_2$H$_5$)$_2$ | OCH$_3$ | C$_6$H$_5$ | H | p-Cl—C$_6$H$_4$ | H | H | 2 | 695 |
| 7 | (II) | N(C$_2$H$_5$)$_2$ | —NC$_6$H$_5$CH$_3$ | H | CH$_3$ | H | p-CH$_3$C$_6$H$_4$ | H | H | 2 | 700 |
| 8 | (II) | 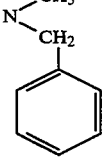 | N(CH$_3$)$_2$ | Cl | H | H | C$_6$H$_5$ | H | CH$_3$ | 1 | 718 |

TABLE 2

| Example no. | A of formula | $X^1$ | $R^1$ | $R^2$ | $R^3$ | $R^6$ | $R^7$ | $R^8$ | analogous to Ex. | $\lambda_{max}$ [nm] |
|---|---|---|---|---|---|---|---|---|---|---|
| 9 | (III) | N(CH$_3$)$_2$ | H | CH$_3$ | C$_6$H$_5$ | CH$_3$ | CH$_3$ | H | 3 | 652 |
| 10 | (III) | N(CH$_3$)$_2$ | C$_6$H$_5$ | H | C$_6$H$_5$ | C$_4$H$_9$ | C$_6$H$_5$ | 5-OCH$_3$ | 2 | 695 |
| 11 | (III) | OCH$_3$ | H | CH$_3$ |  | CH$_3$ | C$_6$H$_5$ | H | 1 | 621 |
| 12 | (III) | N(CH$_3$)$_2$ | p-C$_2$H$_5$O—C$_6$H$_4$ | H | C$_6$H$_5$ | CH$_3$ | C$_6$H$_5$ | 6-Cl | 2 | 647 |
| 13 | (III) | 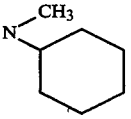 | H | H | C$_6$H$_5$ | C$_2$H$_5$ | p-CH$_3$—C$_6$H$_4$ | H | 3 | 692 |

TABLE 3

| Example no. | A of formula | X¹ | X² | R¹ | R² | R³ | R⁴ | R⁶ | R⁷ | R⁸ | analogous to Ex. | $\lambda_{max}$ [nm] |
|---|---|---|---|---|---|---|---|---|---|---|---|---|
| 14 | (IV) | N(CH₃)₂ | N(C₂H₅)₂ | H | H | C₆H₅ | H | CH₃ | C₆H₅ | H | 1 | 700 |
| 15 | (IV) | N(CH₃)₂ | N(CH₃)₂ | C₆H₅ | H | C₆H₅ | H | CH₃ | C₆H₅ | 5-CH₃ | 2 | 695 |

TABLE 4

| Example no. | A of formula | X¹ | R¹ | R² | R³ | R⁹ | R¹⁰ | R¹¹ | analogous to Ex. | $\lambda_{max}$ [nm] |
|---|---|---|---|---|---|---|---|---|---|---|
| 16 | (V) | N(CH₃)₂ | H | H | p-Cl—C₆H₄ | CH₃ | CH₃ | H | 1 | 545 |
| 17 | (V) | morpholino (N O ring) | H | H | C₆H₅ | CH₃ | CH₃ | 5-Cl | 1 | 552 |
| 18 | (V) | N(CH₃)₂ | H | H | CCl₃ | CH₂C₆H₅ | CH₃ | H | 1 | 545 |

Example 19

3 g of the dihydroquinoline prepared according to Example 4 were dissolved in a mixture of 40 g of dodecylbenzene and 60 g of chloroparaffin (chlorine content of 45% by weight). 223 g of such a solution were mixed with 39.5 g of an oxadiazinetrione based on hexamethylene diisocyanate (NCO content of 20.5% by weight). This was followed by mixing with 320 g of 0.5% by weight aqueous polyvinyl alcohol solution and emulsification in a rotor/stator emulsifying machine. Microcapsules were produced by the addition of 76 g of 9.0% by weight aqueous diethylenetriamine solution. The microcapsule dispersion obtained was subjected to an aftertreatment by heating to 60° C. and stirring for 3 hours at this temperature. This gave an aqueous dispersion containing 40% by weight of microcapsules, the capsules having an average size of 7.3 µm. The capsules contained the dihydroquinoline dissolved in dodecylbenzene/chloroparaffin.

250 ml of this microcapsule dispersion were taken and 40 g of fine cellulose grindings were slowly sprinkled in, with intimate stirring. After 50 minutes of intimate stirring, 40 ml of a 50% by weight styrene/butadiene rubber latex (Baystal ® D 1600 from Bayer AG) were added. The resulting 48.5% by weight brushing paint was diluted with water to a solids content of 30% by weight and coated with an air brush on to the back of a commercially available base paper. The application (determined after drying) was 5 g/m².

The coated side of the paper coated by this process was laid on that side of a commercially available carbonless copy paper which had been coated with acid-activated bentonite as the developing substance. When the paper coated with capsules was written on, an intense. turquoise-coloured copy of very good lightfastness was produced on the copy paper.

When the paper coated with microcapsules was exposed to daylight and writing produced on the second sheet, an equally intense copy was obtained.

Practically identical results were obtained when using a p-tert-butylphenol/formaldehyde condensation product (UCAR ®-CKWA 9870 from UCC) or zinc p-alkyl-salicylate instead of acid-activated bentonite as the developer.

Example 20

32 g of bisphenol A, 3.8 g of the distearylamide of ethylenediamine, 89 g of kaolin, 20 g of an 88% hydrolysed polyvinyl alcohol and 55 ml of water were ground together in a ball mill until the average particle size of the solid substances was 5 µm. 6 g of the dihydroquinoline prepared according to Example 3, 3 g of an 88% by weight hydrolysed polyvinyl alcohol and 60 ml of water were ground together in a second ball mill until the average particle size of the solid was 3 µm. The two dispersions were brought together and coated on to paper to give a coating of 5.5 g/m² after drying. When this paper was brought into contact with a commercially available thermal printing head, an intense dark greenish-blue colouration of good lightfastness and sublimation fastness was obtained at the heated locations.

What is claimed is:

1. Dihydroquinolines of Formula (I),

in which

A is one of the bivalent groups of formulae (II) to (V)

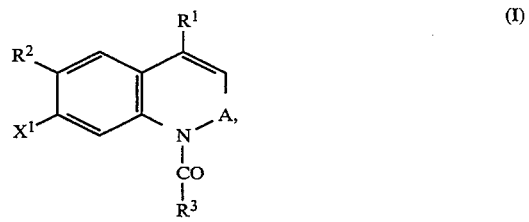

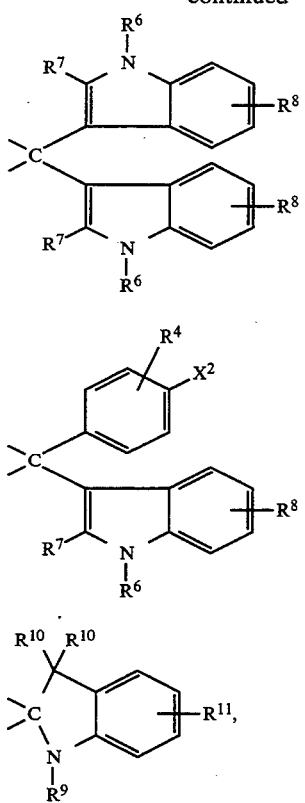

$R^1$ is hydrogen, alkyl or a radical of formula (VI)

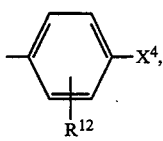

$R^2$, $R^4$, $R^5$, $R^8$, $R^{11}$ and $R^{12}$ independently of one another are each hydrogen, halogen, alkyl or alkoxy, $R^3$ is hydrogen, alkyl, cycloalkyl, aralkyl, aryl or a pyridyl radical, $R^6$ and $R^9$ independently of one another are each hydrogen, alkyl, chloroalkyl or aralkyl, $R^7$ is hydrogen, alkyl, cycloalkyl or aryl, $R^{10}$ is alkyl, and $X^1$, $X^2$, $X^3$ and $X^4$ independently of one another are each hydrogen, halogen, alkyl, alkoxy, cycloalkoxy, aryloxy, dialkylamino, N-alkyl-N-arylamino or a pyrrolidino, piperidino or morpholino radical bonded via a nitrogen atom, with the provisos that in the case where A=a radical of formula (II), (III) or (IV), at most 2 of the radicals $X^1$ to $X^4$ are hydrogen, halogen and/or alkyl, in the case where A=a radical of formula (V), at most one of the radicals $X^1$ and $X^4$ is hydrogen, halogen or alkyl, in the case where the radicals $R^1$ to $R^{12}$ and $X^1$ to $X^4$ are alkyl, they are linear or branched $C_1$–$C_4$-alkyl radicals which are unsubstituted or substituted by at most three substituents from the group consisting of chlorine, hydroxyl, methoxy, ethoxy and cyano, in the case where the radicals $R^2$, $R^4$, $R^5$, $R^8$, $R^{11}$, and $R^{12}$ and $X^1$ to $X^4$ are halogen, they are fluorine or chlorine, in the case where the radicals $R^2$, $R^4$, $R^5$, $R^8$, $R^{11}$, and $R^{12}$ and $X^1$ to $X^4$ are alkoxy, they are linear or branched $C_1$–$C_4$-alkoxy radicals which are unsubstituted or substituted by at most three substituents from the group consisting of chlorine, hydroxyl, methoxy, ethoxy and cyano, in the case where the radicals $R^3$, $R^6$, $R^7$ and $R^9$ are cycloalkyl, they are $C_5$–$C_7$-cycloalkyl radicals which are unsubstituted or substituted by at most two substituents from the group consisting of chlorine, methyl and methoxy, in the case where the radicals $R^3$ and $R^7$ are aryl, they are phenyl which is unsubstituted or substituted by at most 2 substituents from the group consisting of chlorine, methyl and methoxy, in the case where the radicals $X^1$ to $X^4$ are aryloxy, they are phenoxy which is unsubstituted or substituted by at most 2 substituents from the group consisting of chlorine, methyl and methoxy, in the case where the radicals $X^1$ to $X^4$ are dialkylamino and N-alkyl-N-arylamino, the alkyl groups present are linear or branched $C_1$–$C_4$-alkyl groups which are unsubstituted or substituted by a chlorine, hydroxyl, methoxy or cyano group, and in the case where the radicals $X^1$ to $X^4$ are N-alkyl-N-arylamino, the aryl groups present therein are a phenyl radical which is unsubstituted or substituted by at most 2 substituents from the group consisting of chlorine, methyl, methoxy and cyano.

2. Dihydroquinolines of claim 1, in which
as far as the radicals $R^3$, $R^6$ and $R^9$ are aralkyl, they are an unsubstituted benzyl radical, and
as far as the radicals $X^1$ to $X^4$ are cycloalkoxy, they are unsubstituted $C_5$–$C_7$-cycloalkoxy.

3. Dihydroquinolines of claim 1, in which in formula (I),
A is a bivalent group of formula (II),
$R^1$ is hydrogen or a radical of formula (VI),
$R^2$ is hydrogen, chlorine, methyl or methoxy,
$R^3$ is phenyl or phenyl substituted by chlorine, methyl or methoxy,
$R^4$, $R^5$ and $R^{12}$ are hydrogen,
$X^1$ is methoxy, ethoxy, dimethylamino, diethylamino, N-methyl-N-phenylamino, N-methyl-N-(4-methoxyphenyl)-amino, pyrrolidino, piperidino or morpholino,
$X^2$ is dimethylamino, diethylamino, N-methyl-N-phenylamino, N-methyl-N-(4-methoxyphenyl)-amino, pyrrolidino, piperidino or morpholino, and
$X^3$ and $X^4$ independently of one another each are hydrogen, chlorine, methyl, methoxy, ethoxy, dimethylamino, diethylamino, N-methyl-N-phenylamino, N-methyl-N-(4-methoxyphenyl)-amino, pyrrolidino, piperidino or morpholino.

4. Dihydroquinolines of claim 1, in which in formula (I),
A is a bivalent group of formula (III),
$R^1$ is hydrogen or a radical of formula (VI),
$R^2$ is hydrogen, chlorine, methyl or methoxy,
$R^3$ is phenyl optionally substituted by chlorine, methyl or methoxy,
$R^6$ is hydrogen, methyl, ethyl, propyl, butyl or benzyl, $R^7$ is methyl, ethyl, phenyl, 4-methylphenyl or 4-methoxyphenyl, $R^8$ and $R^{12}$ are hydrogen, $X^1$ is methoxy, ethoxy, dimethylamino, diethylamino, N-methyl-N-phenylamino, N-methyl-N-(4-methoxyphenyl)-amino, pyrrolidino, piperidino or morpholino, and $X^4$ is hydrogen, chlorine, methyl, methoxy, ethoxy, dimethylamino, diethylamino, N-methyl-N-phenylamino, N-methyl-N-(4-methoxyphenyl)-amino, pyrrolidino, piperidino or morpholino.

5. Dihydroquinolines of claim 1, in which in formula (I),

A is a bivalent group of formula (IV), $R^1$ is hydrogen or the radical of formula (VI), $R^2$ is hydrogen, chlorine, methyl or methoxy, $R^3$ is phenyl or phenyl substituted by chlorine, methyl or methoxy, $R^6$ is hydrogen, methyl, ethyl, propyl, butyl or benzyl, $R^7$ is methyl, ethyl, phenyl, 4-methylphenyl or 4-methoxyphenyl, $R^4$ and $R^8$ are hydrogen, $X^1$ is methoxy, ethoxy, dimethylamino, diethylamino, N-methyl-N-phenylamino, N-methyl-N-(4-methoxyphenyl)-amino, pyrrolidino, piperidino or morpholino, $X^2$ is dimethylamino, diethylamino, N-methyl-N-phenylamino, N-methyl-N-(4-methoxyphenyl)-amino, pyrrolidino, piperidino or morpholino, and $X^4$ is hydrogen, chlorine, methyl, methoxy, ethoxy, dimethylamino, diethylamino, N-methyl-N-phenylamino, N-methyl-N-(4-methoxyphenyl)-amino, pyrrolidino, piperidino or morpholino.

6. Dihydroquinolines of claim 1, in which in formula (I),

A is a bivalent group of formula (V), $R^1$ is hydrogen or a radical of formula (VI), $R^2$ is hydrogen, chlorine, methyl or methoxy, $R^3$ is phenyl or phenyl substituted by chlorine, methyl or methoxy, $R^9$ is methyl, ethyl or benzyl, $R^{10}$ is methyl, $R^{11}$ is hydrogen, and $X^1$ is methoxy, ethoxy, dimethylamino, diethylamino, N-methyl-N-phenylamino, N-methyl-N-(4-methoxyphenyl)-amino, pyrrolidino, piperidino or morpholino.

* * * * *